US011008060B1

(12) United States Patent
Liu (10) Patent No.: US 11,008,060 B1
(45) Date of Patent: May 18, 2021

(54) VERTICAL BIKE STAND

(71) Applicant: YEONG TON INDUSTRIAL CO., LTD., Tainan (TW)

(72) Inventor: Yao-Huang Liu, Tainan (TW)

(73) Assignee: YEONG TON INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/855,425

(22) Filed: Apr. 22, 2020

(51) Int. Cl.
| | | |
|---|---|---|
| *B62H 3/08* | (2006.01) |
| *B62H 3/12* | (2006.01) |
| *B62H 3/02* | (2006.01) |
| *B62H 3/04* | (2006.01) |
| *B62H 3/10* | (2006.01) |
| *F16M 11/28* | (2006.01) |

(52) U.S. Cl.
CPC ............... *B62H 3/08* (2013.01); *B62H 3/02* (2013.01); *B62H 3/04* (2013.01); *B62H 3/10* (2013.01); *B62H 3/12* (2013.01); *F16M 11/28* (2013.01); *F16M 2200/028* (2013.01)

(58) Field of Classification Search
CPC ... B62H 3/08; B62H 3/04; B62H 3/12; B62H 3/02; B62H 3/10; Y10T 70/5872; Y10T 70/5876; Y10T 70/5881; G07F 17/10; F16M 11/28; F16M 2200/028
See application file for complete search history.

(56) References Cited

U.S. PATENT DOCUMENTS

| | | | | |
|---|---|---|---|---|
| 5,320,227 A | * | 6/1994 | Minoura | B62H 3/00 211/22 |
| 5,497,967 A | * | 3/1996 | Gantois | B25H 1/0014 211/22 |
| 7,028,850 B1 | * | 4/2006 | Sargisian | B25H 1/0014 211/17 |
| 7,344,117 B2 | * | 3/2008 | She | F16M 11/28 248/354.4 |
| 8,807,506 B2 | * | 8/2014 | Hanlon | F16M 11/18 248/354.4 |
| 8,851,301 B1 | * | 10/2014 | Ho | B62H 3/04 211/20 |

* cited by examiner

*Primary Examiner* — Ko H Chan
(74) *Attorney, Agent, or Firm* — Alan D. Kamrath; Karin L. Williams; Mayer & Williams PC (57) ABSTRACT

A vertical bike stand contains: a base, a coupling column, a guide groove, and a positioning rack. The positioning rack includes a toothed section, and the support tube includes a channel. A holder is arranged on the support tube and is configured to close the channel and includes two prongs and a recess. A fixer is fitted on the support tube and is rotatably connected with a connector. The connector includes a shaft rotatably connected with the fixer, a press tab extending from an upper end of the connector, an operation portion extending outward from the press tab, an orientation segment extending into the guide groove from a lower end of the connector, and a paw extending from the orientation segment and configured to engage with the toothed section. The orientation segment is pushed by a first resilient element to fix in the fixer.

6 Claims, 9 Drawing Sheets

VERTICAL BIKE STAND

BACKGROUND OF THE INVENTION

Field of the Invention

The present invention relates to a vertical bike stand which contains a base configured to fix a rear wheel of a bicycle, and the base includes a support tube arranged on a rear end of the base and configured to support post of the bicycle.

Description of the Prior Art

Figure 1:
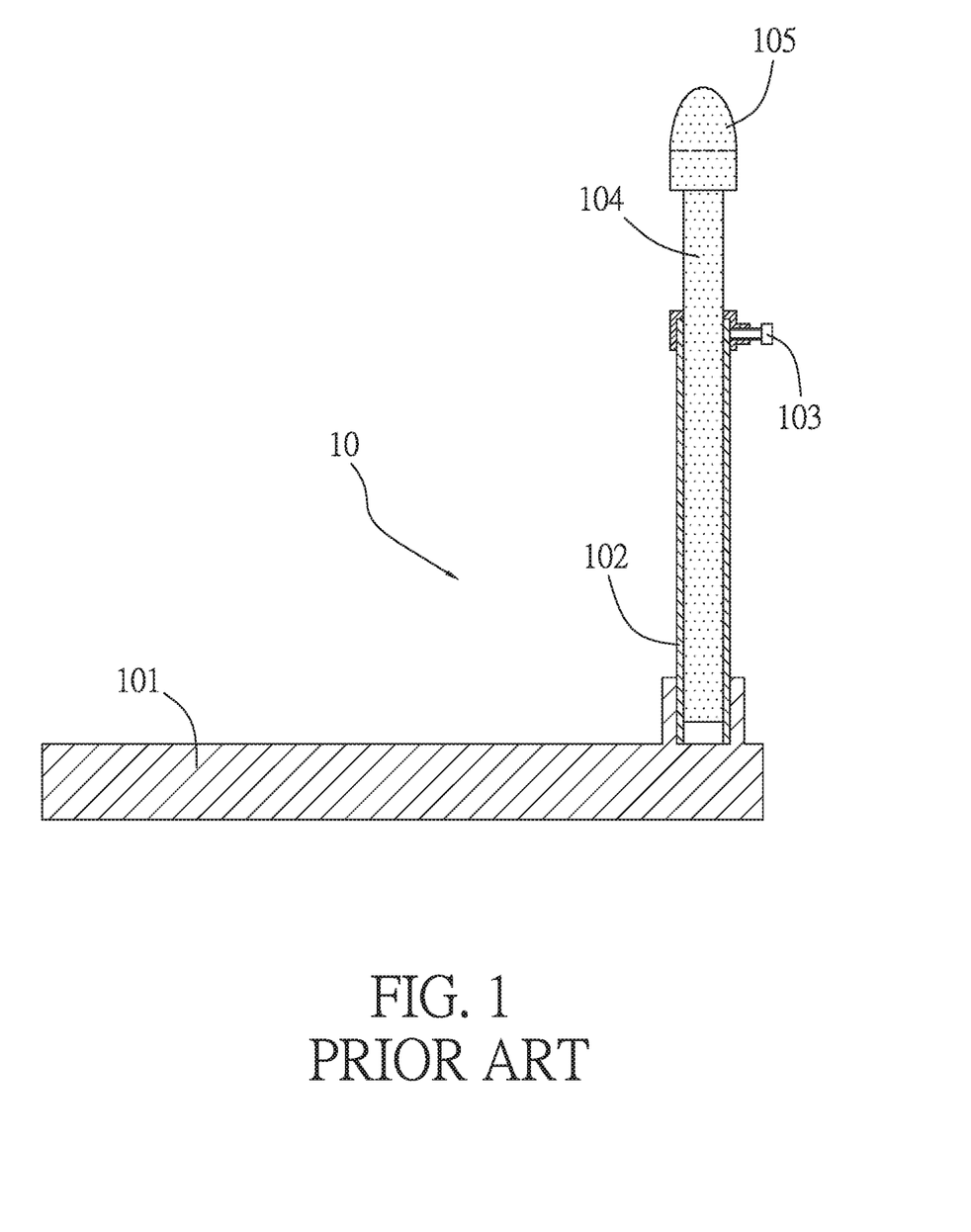
FIG. 1 is a cross sectional view showing the assembly of a conventional vertical bike stand.

A conventional vertical bike stand 10 contains a base 101 and an accommodation tube 102 extending upward from a rear end of the base 101, a positioning bolt 103 extending through an upper end of the accommodation tube 102, a connection tube 104 accommodated in the accommodation tube 102, and a support portion 105 connected on an upper end of the connection tube 104, as shown in FIG. 1.

Figure 2:
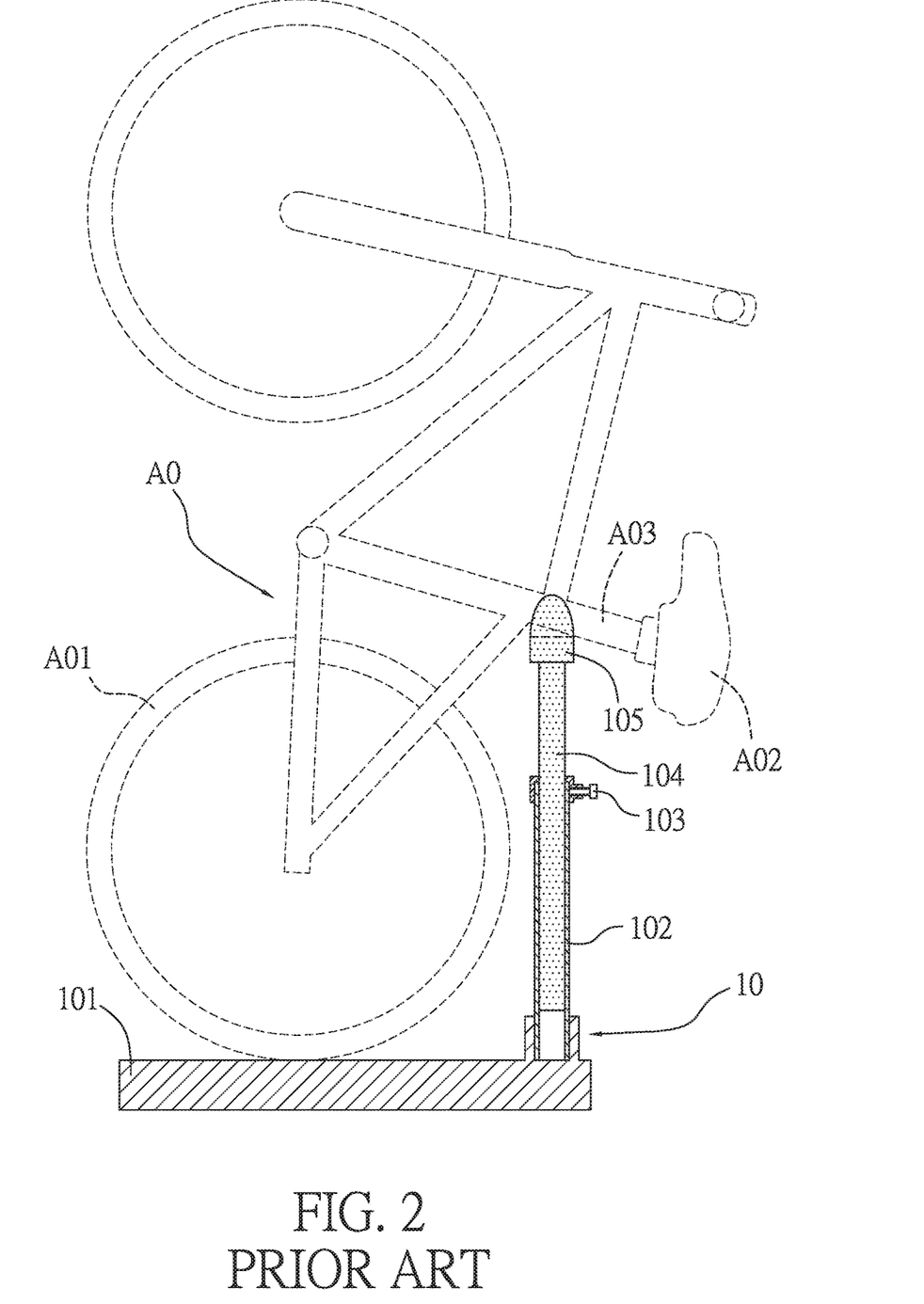
FIG. 2 is a cross sectional view showing the application of the conventional vertical bike stand.
Figure 3:
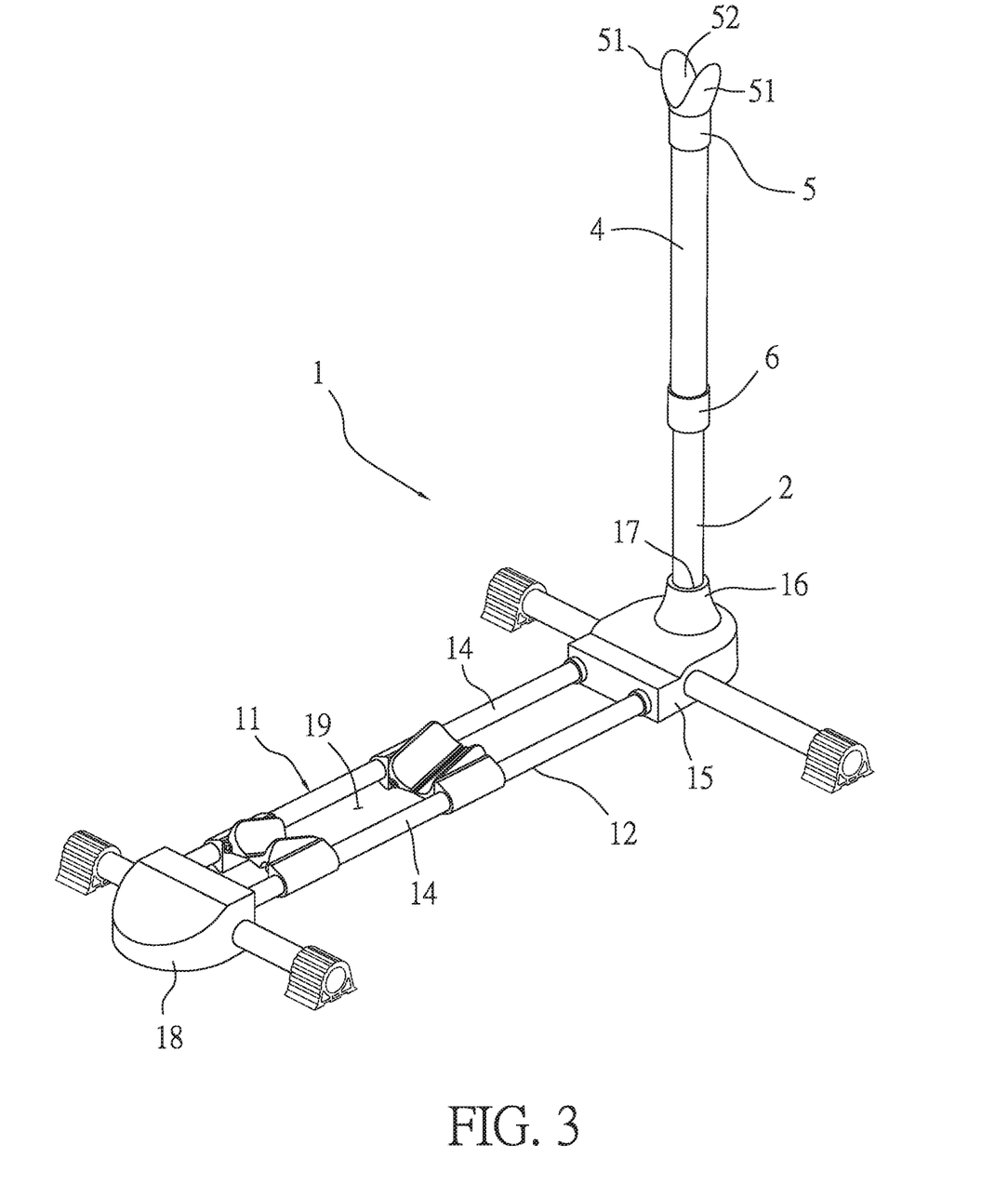
FIG. 3 is a perspective view showing the assembly of a vertical bike stand according to a preferred embodiment of the present invention.

In use, the base 101 is configured to fix a rear wheel A01 of a bicycle AO, and the bicycle AO is turned over and erected so that a support post A03 on which a cushion A02 is mounted, is moved close to the support portion 105. Then, the connection tube 104 is slid along the accommodation tube 102 to drive the support portion 105 to support the support post A03 in a desired position, and the positioning bolt 103 locks the connection tube 104, thus fixing the support post A03, as shown in FIG. 2.

However, the connection tube 104 is not oriented, for example, the connection tube 104 is adjusted to an angle and is locked by the positioning bolt 103, thus rotating the positioning bolt 103 and fixing the connection tube 104 troublesomely. Furthermore, when the positioning bolt 103 is not rotated tightly, the connection tube 104 is released, thus falling the bicycle AO on a ground, as illustrated in FIG. 2.

The present invention has arisen to mitigate and/or obviate the afore-described disadvantages.

SUMMARY OF THE INVENTION

The primary objective of the present invention is to provide a vertical bike stand which contains a connector including an operation portion extending outward from a press tab and an orientation segment extending into a guide groove from a lower end of the connector so that a support tube and a recess of a holder are oriented, and the orientation segment is pushed by a first resilient element to force a paw to engage with a toothed section, hence the support tube controls a moveable height of the holder by engaging the paw of the connector with the toothed section.

To achieve above-mentioned objective, a vertical bike stand provided by the present invention contains: a base, a coupling column extending upward from a rear end of the base, a guide groove defined on the coupling column, and a positioning rack accommodated in the guide groove. The positioning rack includes a toothed section formed thereon, the coupling column is fitted with a support tube, and the support tube includes a channel defined thereon and configured to slide the support tube in the coupling column, a holder is arranged on a top of the support tube and is configured to close the channel, wherein the holder includes two prongs extending upward from two sides thereof respectively and a recess defined between the two prongs, wherein a fixer is fitted on a bottom of the support tube and is rotatably connected with a connector, and the connector includes a shaft extending through two sides of a middle section thereof and rotatably connected with the fixer, a press tab extending from an upper end of the connector, an operation portion extending outward from the press tab, an orientation segment extending into the guide groove from a lower end of the connector, and a paw extending from the orientation segment and configured to engage with the toothed section, wherein the orientation segment is pushed by a first resilient element to fix in the fixer. In addition, the toothed section has a pushing face formed on a top thereof and perpendicular to the positioning rack, and the toothed section has a tilted slide face defined below the pushing face. The paw of the orientation segment has a contact face formed on a bottom thereof and abutting against the pushing face, and the paw has a tooth fence formed on the contact face and contacting with the tilted slide face.

Preferably, the guide groove is defined on a rear end of the coupling column and is configured to accommodate the positioning rack, and the toothed section is formed on a rear end of the positioning rack, the support tube further includes a slot defined on a rear side of a lower end thereof, and the support tube includes a locating orifice formed on the slot, the fixer includes a sheath fitted on the bottom of the support tube, and the fixer includes an abutting ring contacting with an inner wall of the bottom of the support tube, a limiting face extending from the abutting ring, a trough corresponding to the slot, an engagement protrusion, and a defining orifice corresponding to the locating orifice, and a cutout formed on an inner wall of the engagement protrusion. A case is accommodated in the fixer, and the cap includes a lower fringe configured to contact with the limiting face, a chamber defined in the fixer, and a retaining sheet configured to abut against the cutout, wherein the chamber accommodates with the connector by matching with the slot, and the case includes two accommodation holes defined on two sides of the chamber respectively and configured to receive a shaft, a passing hole defined above the chamber so that the operation portion extends out of the passing hole of the case backward, and a limitation hole defined on the retaining sheet and corresponding to the locating orifice and the defining orifice, wherein a screw element is inserted through the limitation hole, the locating orifice, and the defining orifice.

The screw element includes a first part and a second part. The first part has a first head formed on a first end thereof and received in the guide groove, an extension extending to the locating orifice, the limitation hole, and the defining orifice from the first head, and a threaded hole defined in the extension. After the threaded hole is screwed with the threaded stem, the sheath and the case are defined between the first head and the second head and are fixed in the support tube.

The vertical bike stand further contains at least one joining tube arranged on two sides of the base respectively, wherein a front end of a respective joining tube is higher than a rear end of the respective joining tube, and the respective joining tube has a curved portion formed on a front end thereof, two connecting rods parallelly extending from two sides of the curved portion respectively, a holding seat connected with two rear ends of the two connecting rods, a mounting extending upward from a top of the holding seat, and a cavity defined in a top of the mounting perpendicular to the base and receiving the coupling column, wherein at least one screw bolt is inserted through the holding seat to fix the coupling column in the cavity. The curved portion has a securing block mounted thereon, and a trench is defined by the securing block, the two connecting rods, and the holding seat of the base.

BRIEF DESCRIPTION OF THE DRAWINGS

FIG. 4 is a perspective view showing the exploded components of a coupling column of the vertical bike stand according to the preferred embodiment of the present invention.

FIG. 4-1 is an amplified perspective view of a part of FIG. 4.

FIG. 5 is a cross sectional view showing the assembly of the coupling column of the vertical bike stand according to the preferred embodiment of the present invention.

FIG. 5-1 is an amplified perspective view of a part of FIG. 5.

FIG. 6 is a cross sectional view showing the operation of the coupling column of the vertical bike stand according to the preferred embodiment of the present invention.

FIG. 6-1 is an amplified perspective view of a part of FIG. 6.

FIG. 8-1 is an amplified perspective view of a part of FIG. 8.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

With reference to FIGS. 3, 4, 4-1, 5, and 5-1, a vertical bike stand 1 according to a preferred embodiment of the present invention comprises: a base 11, a coupling column 2 extending upward from a rear end of the base 11, a guide groove 21 defined on the coupling column 2, and a positioning rack 3 accommodated in the guide groove 21, wherein the positioning rack 3 includes a toothed section 31 formed thereon. The coupling column 2 is fitted with a support tube 4, and the support tube 4 includes a channel 41 defined thereon and configured to slide the support tube 4 in the coupling column 2, a holder 5 is arranged on a top of the support tube 4 and is configured to close the channel 41, wherein the holder 5 includes two prongs 51 extending upward from two sides thereof respectively and a recess 52 defined between the two prongs 51. A fixer 6 is fitted on a bottom of the support tube 4 and is rotatably connected with a connector 7, and the connector 7 includes a shaft 71 extending through two sides of a middle section thereof and rotatably connected with the fixer 6, a press tab 72 extending from an upper end of the connector 7, an operation portion 73 extending outward from the press tab 72, an orientation segment 74 extending into the guide groove 21 from a lower end of the connector 7, and a paw 75 extending from the orientation segment 74 and configured to engage with the toothed section 31, wherein the orientation segment 74 is pushed by a first resilient element AA to fix in the fixer 6.

Figures 4, 41:
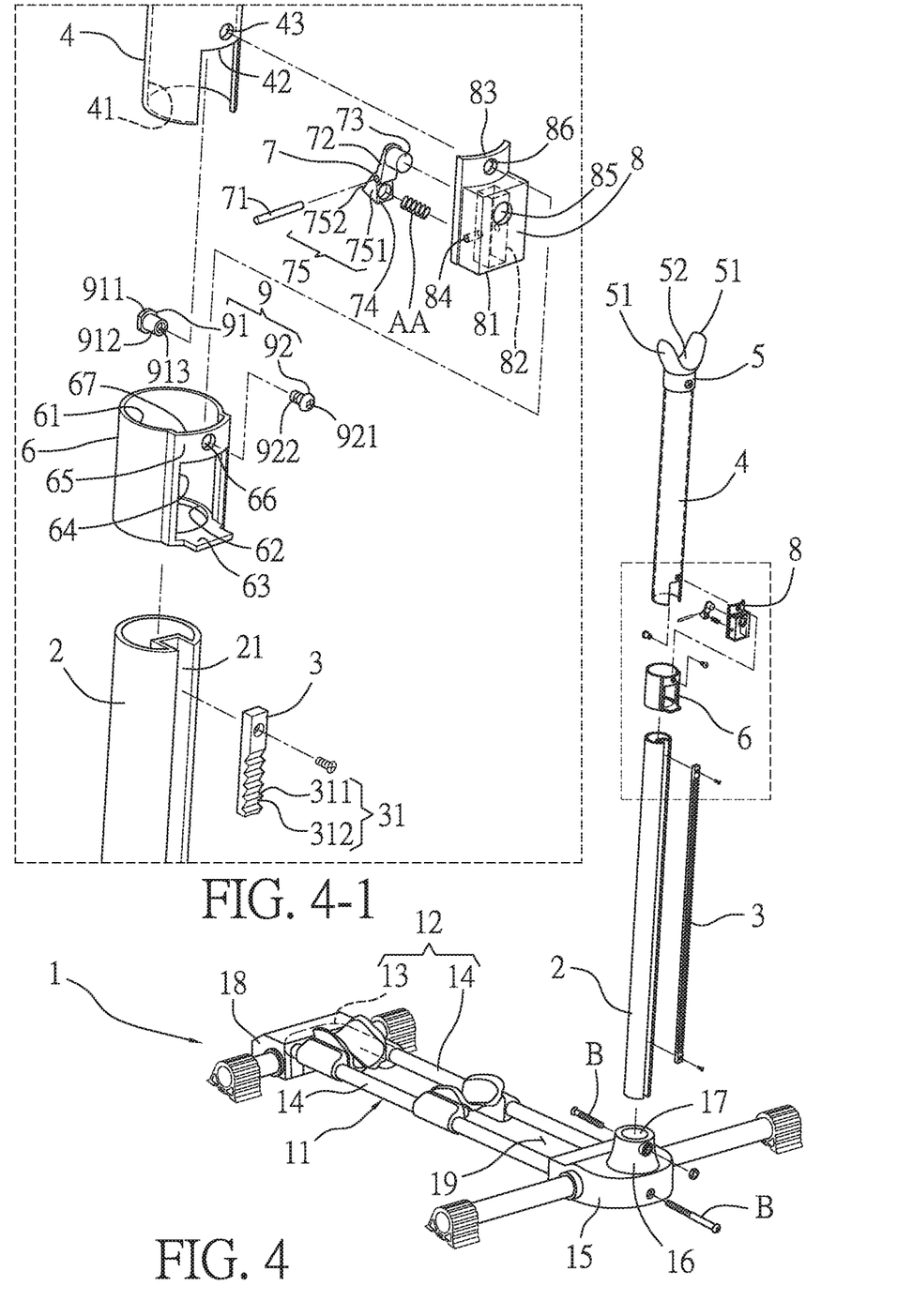
Figures 5, 51:
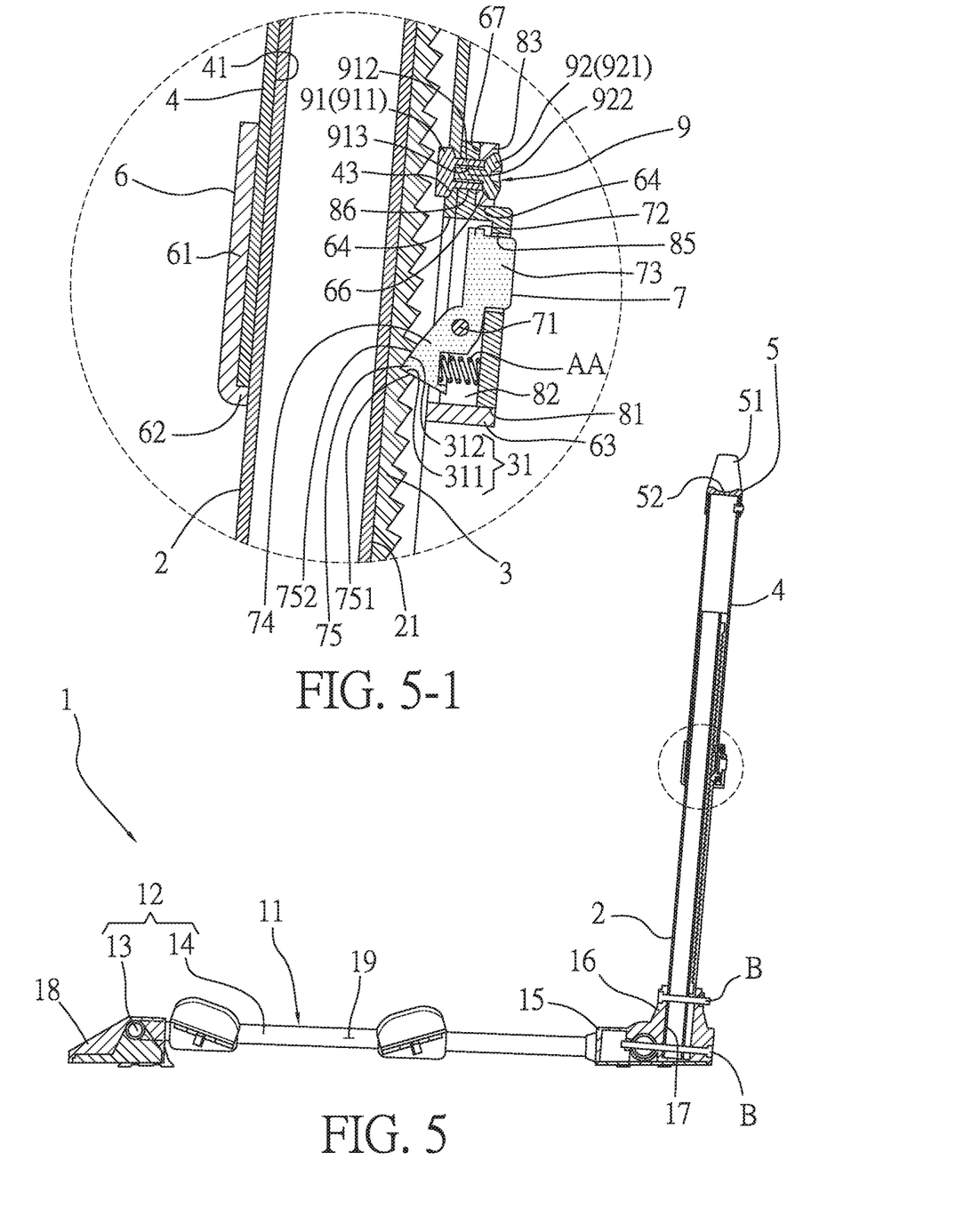

The toothed section 31 has a pushing face 311 formed on a top thereof and perpendicular to the positioning rack 3, and the toothed section 31 has a tilted slide face 312 defined below the pushing face 311. The paw 75 of the orientation segment 74 has a contact face 751 formed on a bottom thereof and abutting against the pushing face 311, and the paw 75 has a tooth fence 752 formed on the contact face 751 and contacting with the tilted slide face 312, as illustrated in FIGS. 4, 4-1, 5 and 5-1.

The guide groove 21 is defined on a rear end of the coupling column 2 and is configured to accommodate the positioning rack 3, and the toothed section 31 is formed on a rear end of the positioning rack 3. The support tube 4 further includes a slot 42 defined on a rear side of a lower end thereof, and the support tube 4 includes a locating orifice 43 formed on the slot 42. The fixer 6 includes a sheath 61 fitted on the bottom of the support tube 4, and the fixer 6 includes an abutting ring 62 contacting with an inner wall of the bottom of the support tube 4, a limiting face 63 extending from the abutting ring 62, a trough 64 defined on a peripheral side of the fixer 6 above the limiting face 63 and corresponding to the slot 42, an engagement protrusion 65 formed above the trough 64, and a defining orifice 66 corresponding to the locating orifice 43, and a cutout 67 formed on an inner wall of the engagement protrusion 65. A case 8 is accommodated in the fixer 6, and the case 8 includes a lower fringe 81 configured to contact with the limiting face 63, a chamber 82 defined in the fixer 6, and a retaining sheet 83 configured to abut against the cutout 67, wherein the chamber 82 accommodates with the connector 7 by matching with the slot 42, and the case 8 includes two accommodation holes 84 defined on two sides of the chamber 82 respectively and configured to receive a shaft 71, a passing hole 85 defined above the chamber 82 so that the operation portion 74 extends out of the passing hole 85 of the case 8 backward, and a limitation hole 86 defined on the retaining sheet 83 and corresponding to the locating orifice 43 and the defining orifice 66, wherein a screw element 9 is inserted through the limitation hole 86, the locating orifice 43, and the defining orifice 66. The connector 7 includes an orientation segment 74 extending into the guide groove 21 from the lower end of the connector 7, the paw 75 extending from the orientation segment 74 and configured to engage with the toothed section 31, wherein the orientation segment 74 is pushed by the first resilient element AA limited in the chamber 82, as shown in FIGS. 4, 4-1, 5, and 5-1.

The screw element 9 includes a first part 91 and a second part 92, wherein the first part 91 has a first head 911 formed on a first end thereof and received in the guide groove 21, an extension 912 extending to the locating orifice 43, the limitation hole 86, and the defining orifice 66 from the first head 911, and a threaded hole 913 defined in the extension 912. The second part 92 has a second head 921, a threaded stem 922 extending from the second head 921 and screwed with the threaded hole 913, wherein after the threaded hole 913 is screwed with the threaded stem 922, the sheath 61 and the case 8 are defined between the first head 911 and the second head 921 and are fixed in the support tube 4, as shown in FIGS. 4, 4-1, 5, and 5-1.

Figures 6, 61:
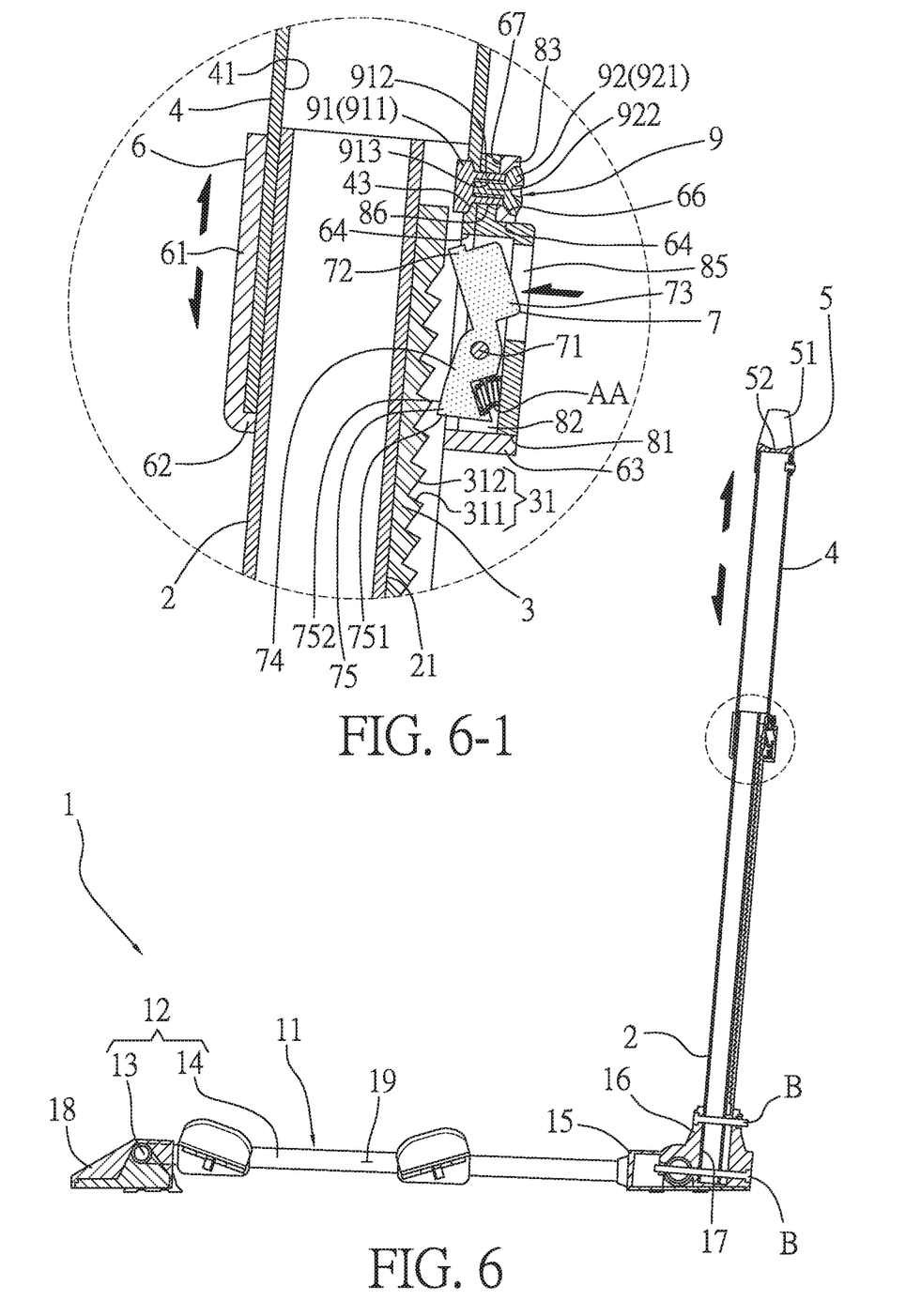
Figure 7:
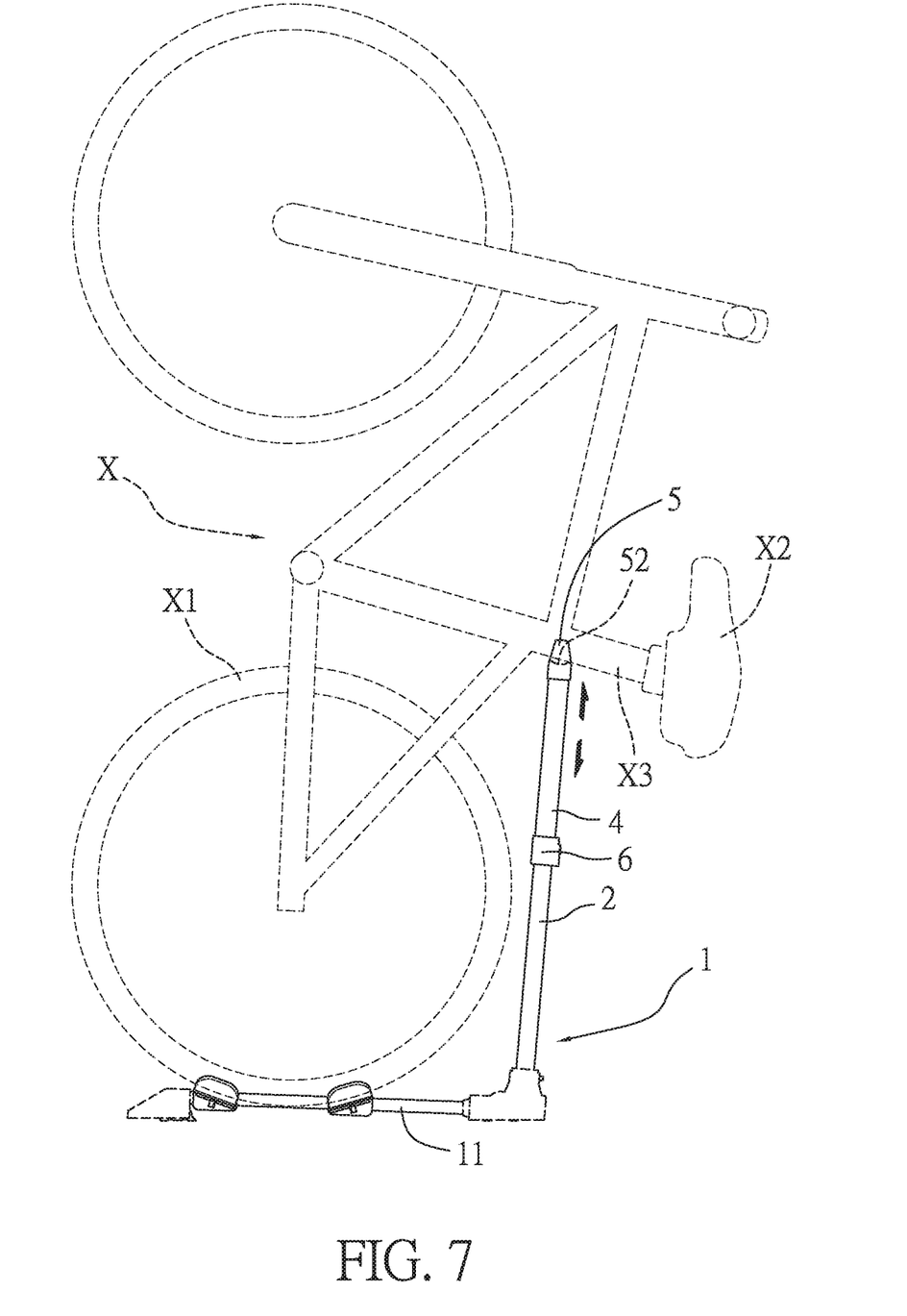
FIG. 7 is a side plan view showing the application of the vertical bike stand according to the preferred embodiment of the present invention.
Figure 8:
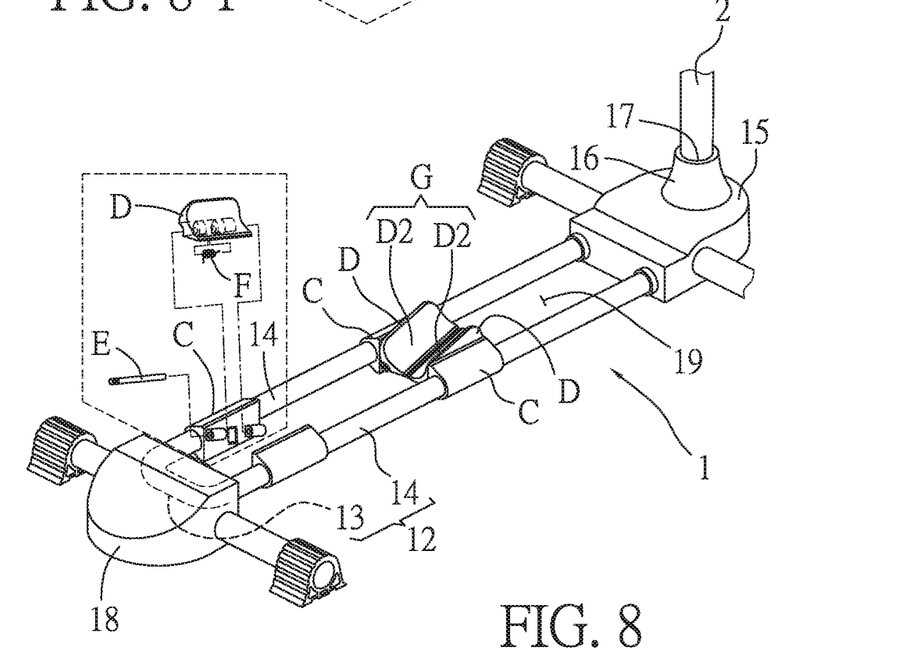
FIG. 8 is a perspective view showing the exploded components of a base of the vertical bike stand according to the preferred embodiment of the present invention.
Figure 9:
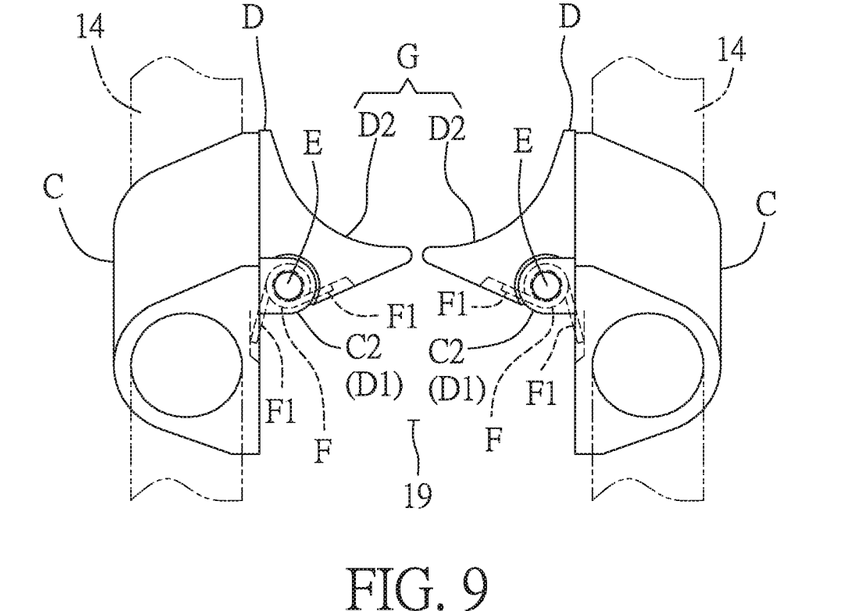
FIG. 9 is a side plan view showing the assembly of the base of the vertical bike stand according to the preferred embodiment of the present invention.
Figure 10:
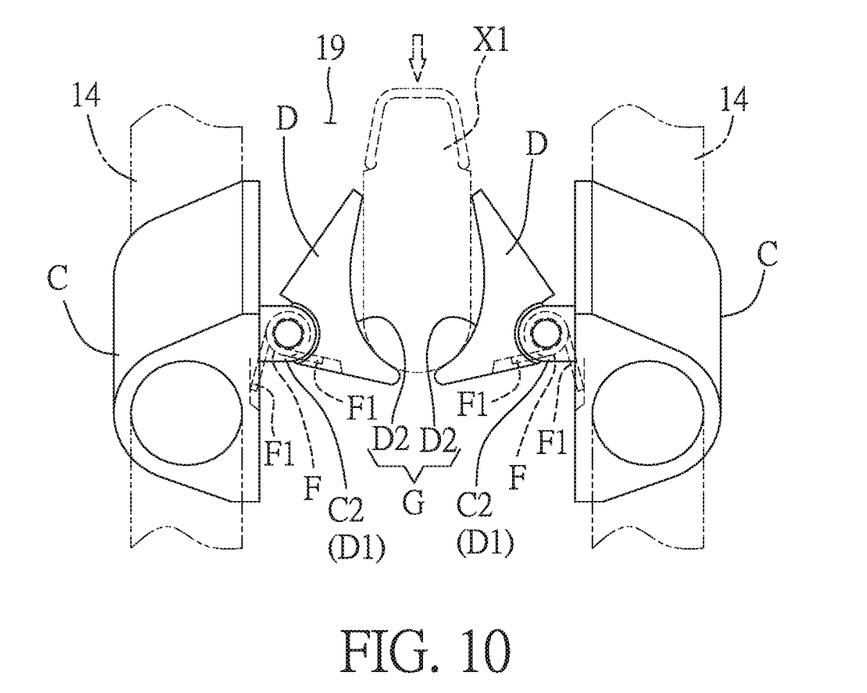
FIG. 10 is a side plan view showing the operation of the base of the vertical bike stand according to the preferred embodiment of the present invention.
Figure 81:
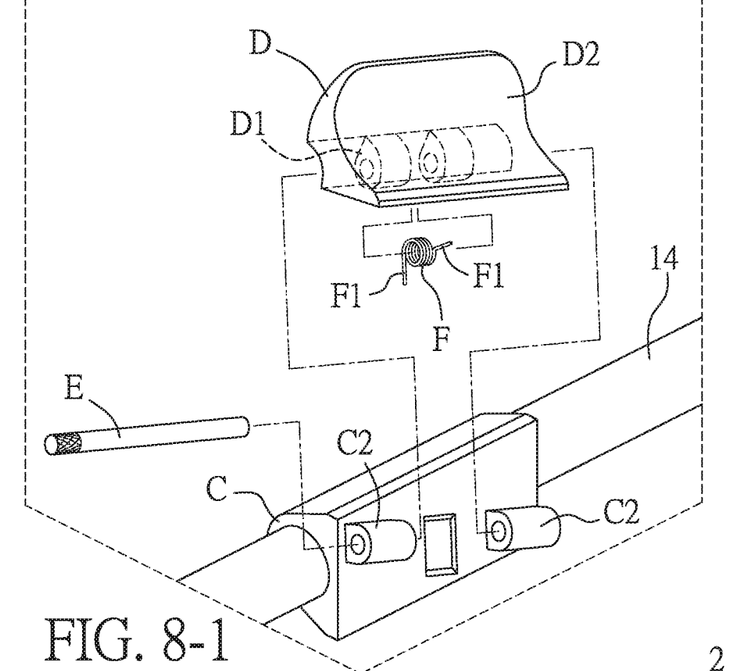

The connector 7 includes the operation portion 73 extending outward from the press tab 72, and the orientation segment 74 extends into the guide groove 21 from the lower end of the connector 7 so that the support tube 4 and the recess 52 of the holder 5 are oriented, and the orientation segment 74 is pushed by the first resilient element AA to force the paw 75 to engage with the toothed section 31, hence the support tube 4 controls a moveable height of the holder 5 by engaging the paw 75 of the connector 7 with the toothed section 31. In use, the base 11 is configured to fix a rear wheel X1 of a bicycle X, and a rear end of the bicycle X is erected on the base 11 so that a support post X3, on which a cushion X2 is fixed, is mounted on the recess 52 of the holder 5 after the support tube 4 is slid along the coupling column 2 to adjustably move the recess 53 upward to the support post X3. When moving the recess 52 upward, the support tube 4 is pulled upward so that the tooth fence 752 moves across the tilted slide face 312 to adjust the recess 52 to a desired position, and the contact face 751 of the paw 75 contacts with the pushing face 311. As desiring to retract the support tube 4 downward, the operation portion 73 is pressed to remove the paw 75 from the toothed section 31, thus retracting the support tube 4, as shown in FIGS. 6 and 6-1. The bicycle X is erected on the vertical bike stand 1 as illustrated in FIG. 7.

The vertical bike stand 1 further comprises at least one joining tube 12 arranged on two sides of the base 11 respectively, wherein a front end of a respective joining tube 12 is higher than a rear end of the respective joining tube 12, and the respective joining tube 12 has a curved portion 13 formed on a front end thereof, two connecting rods 14 parallelly extending from two sides of the curved portion 13 respectively, a holding seat 15 connected with two rear ends of the two connecting rods 14, a mounting 16 extending upward from a top of the holding seat 15, and a cavity 17 defined in a top of the mounting 16 perpendicular to the base 11 and receiving the coupling column 2, wherein at least one screw bolt B is inserted through the holding seat 15 to fix the coupling column 2 in the cavity 17. The curved portion 13 has a securing block 18 mounted thereon, and a trench 19 is defined by the securing block 18, the two connecting rods 14, and the holding seat 15 of the base 11, as shown in FIGS. 4, 4-1, 5, 5-1, 6, 6-1, 8 and 8-1.

The respective connecting rod 14 has at least four projections C located inside the trench 19, at least two rotatable connections C2 arranged on two ends of a respective projection C and tilting downward, and the at least two rotatable connections C2 are arranged on two sides of the trench 19 respectively, wherein a respective rotatable connection C has a rotary retainer D rotatably connected thereon, and the rotary retainer D has a biasing portion D1 configured to match with a respective rotatable connection C2, wherein an insertion E is inserted through the respective rotatable connection C2 and the biasing portion D1, and a second resilient element F is inserted through the insertion E and has two returning segments F1, wherein one of the two returning segments F1 abuts against the respective rotatable connection C2, and the other returning segment F1 contacts with a lower end of the biasing portion D. The biasing portion D has an arcuate face D2 parallel to the respective rotatable connection C2, and an accommodating room G is defined between the arcuate face D2 and the trench 19, such that the rear wheel X1 is mounted on the arcuate face D2 of the biasing portion D, as shown in FIGS. 8, 8-1, 9 and 10.

The connector 7 includes the operation portion 73 extending outward from the press tab 72, and the orientation segment 74 extends into the guide groove 21 from the lower end of the connector 7 so that the support tube 4 and the recess 52 of the holder 5 are oriented, and the orientation segment 74 is pushed by the first resilient element AA to force the paw 75 to engage with the toothed section 31, hence the support tube 4 controls the moveable height of the holder 5 by engaging the paw 75 of the connector 7 with the toothed section 31. When moving the recess 52 upward, the support tube 4 is pulled upward so that the tooth fence 752 moves across the tilted slide face 312 to adjust the recess 52 to the desired position, and the contact face 751 of the paw 75 contacts with the pushing face 311. As desiring to retract the support tube 4 downward, the operation portion 73 is pressed to remove the paw 75 from the toothed section 31, thus retracting the support tube 4 easily.

While various embodiments in accordance with the present invention have been shown and described, it is clear to those skilled in the art that further embodiments may be made without departing from the scope of the present invention.

What is claimed is:

1. A vertical bike stand comprising:
a base, a coupling column extending upward from a rear end of the base, a guide groove defined on the coupling column, and a positioning rack accommodated in the guide groove, wherein the positioning rack includes a toothed section formed thereon, the coupling column is fitted with a support tube, and the support tube includes a channel defined thereon and configured to slide the support tube in the coupling column, a holder is arranged on a top of the support tube and is configured to close the channel, wherein the holder includes two prongs extending upward from two sides thereof respectively and a recess defined between the two prongs, wherein a fixer is fitted on a bottom of the support tube and is rotatably connected with a connector, and the connector includes a shaft extending through two sides of a middle section thereof and rotatably connected with the fixer, a press tab extending from an upper end of the connector, an operation portion extending outward from the press tab, an orientation segment extending into the guide groove from a lower end of the connector, and a paw extending from the orientation segment and configured to engage with the toothed section, wherein the orientation segment is pushed by a first resilient element to fix in the fixer.

2. The vertical bike stand as claimed in claim 1, wherein the toothed section has a pushing face formed on a top thereof and perpendicular to the positioning rack, and the toothed section has a tilted slide face defined below the pushing face; the paw of the orientation segment has a contact face formed on a bottom thereof and abutting against the pushing face, and the paw has a tooth fence formed on the contact face and contacting with the tilted slide face.

3. The vertical bike stand as claimed in claim 1, wherein the guide groove is defined on a rear end of the coupling column and is configured to accommodate the positioning rack, and the toothed section is formed on a rear end of the positioning rack, the support tube further includes a slot defined on a rear side of a lower end thereof, and the support tube includes a locating orifice formed on the slot, the fixer includes a sheath fitted on the bottom of the support tube, and the fixer includes an abutting ring contacting with an inner wall of the bottom of the support tube, a limiting face extending from the abutting ring, a trough corresponding to the slot, an engagement protrusion, and a defining orifice corresponding to the locating orifice, and a cutout formed on an inner wall of the engagement protrusion; a case is accommodated in the fixer, and the cap includes a lower fringe configured to contact with the limiting face, a chamber defined in the fixer, and a retaining sheet configured to abut against the cutout, wherein the chamber accommodates with the connector by matching with the slot, and the case includes two accommodation holes defined on two sides of the chamber respectively and configured to receive a shaft, a passing hole defined above the chamber so that the operation portion extends out of the passing hole of the case backward, and a limitation hole defined on the retaining sheet and corresponding to the locating orifice and the defining orifice, wherein a screw element is inserted through the limitation hole, the locating orifice, and the defining orifice, wherein the connector includes an orientation segment extending into the guide groove from the lower end of the connector, the paw extending from the orientation segment and configured to engage with the toothed section, wherein the orientation segment is pushed by the first resilient element limited in the chamber.

4. The vertical bike stand as claimed in claim 3, wherein the screw element includes a first part and a second part, the first part has a first head formed on a first end thereof and received in the guide groove, an extension extending to the locating orifice, the limitation hole, and the defining orifice from the first head, and a threaded hole defined in the extension; the second part has a second head, a threaded stem extending from the second head and screwed with the threaded hole, wherein after the threaded hole is screwed with the threaded stem, the sheath and the case are defined between the first head and the second head and are fixed in the support tube.

5. The vertical bike stand as claimed in claim 1, wherein the vertical bike stand further comprises at least one joining tube arranged on two sides of the base respectively, wherein a front end of a respective joining tube is higher than a rear end of the respective joining tube, and the respective joining tube has a curved portion formed on a front end thereof, two connecting rods parallelly extending from two sides of the curved portion respectively, a holding seat connected with two rear ends of the two connecting rods, a mounting extending upward from a top of the holding seat, and a cavity defined in a top of the mounting perpendicular to the base and receiving the coupling column, wherein at least one screw bolt is inserted through the holding seat to fix the coupling column in the cavity; the curved portion has a securing block mounted thereon, and a trench is defined by the securing block, the two connecting rods, and the holding seat of the base.

6. The vertical bike stand as claimed in claim 5, wherein the respective connecting rod has at least four projections located inside the trench, at least two rotatable connections arranged on two ends of a respective projection and tilting downward, and the at least two rotatable connections are arranged on two sides of the trench respectively, wherein a respective rotatable connection has a rotary retainer rotatably connected thereon, and the rotary retainer has a biasing portion configured to match with a respective rotatable connection, wherein an insertion is inserted through the respective rotatable connection and the biasing portion, and a second resilient element is inserted through the insertion and has two returning segments, wherein one of the two returning segments abuts against the respective rotatable connection, and the other returning segment contacts with a lower end of the biasing portion; the biasing portion has an arcuate face parallel to the respective rotatable connection, and an accommodating room is defined between the arcuate face and the trench.

\* \* \* \* \*